United States Patent
Tayebi et al.

(10) Patent No.: US 12,062,125 B2
(45) Date of Patent: Aug. 13, 2024

(54) METHOD FOR GENERATING ANIMATED SENTENCES FOR SIGN LANGUAGE TRANSLATION

(71) Applicant: KARA TECHNOLOGIES LIMITED, Auckland (NZ)

(72) Inventors: Arash Tayebi, Auckland (NZ); Craig Vaz, Auckland (NZ); Farmehr Farhour, Auckland (NZ)

(73) Assignee: KARA TECHNOLOGIES LIMITED, Auckland (NZ)

( * ) Notice: Subject to any disclaimer, the term of this patent is extended or adjusted under 35 U.S.C. 154(b) by 0 days.

(21) Appl. No.: 18/555,238

(22) PCT Filed: Oct. 28, 2022

(86) PCT No.: PCT/NZ2022/050133
§ 371 (c)(1),
(2) Date: Oct. 12, 2023

(87) PCT Pub. No.: WO2023/075613
PCT Pub. Date: May 4, 2023

(65) Prior Publication Data
US 2024/0203017 A1   Jun. 20, 2024

(30) Foreign Application Priority Data
Oct. 29, 2021   (NZ) ........................... 781756

(51) Int. Cl.
G06T 13/40   (2011.01)
(52) U.S. Cl.
CPC .................. *G06T 13/40* (2013.01)

(58) Field of Classification Search
None
See application file for complete search history.

(56) References Cited

U.S. PATENT DOCUMENTS

| | | |
|---|---|---|
| 5,999,195 A | 12/1999 | Santangeli |
| 8,134,558 B1 | 3/2012 | Mayhew |
| 9,431,027 B2 | 8/2016 | Ng-Thow-Hing et al. |
| 9,824,480 B2 | 11/2017 | Geisner et al. |
| 10,372,790 B2 | 8/2019 | Langels et al. |
| 10,388,053 B1 | 8/2019 | Carter et al. |
| 2004/0169656 A1 | 9/2004 | David Piponi et al. |

(Continued)

FOREIGN PATENT DOCUMENTS

| | | |
|---|---|---|
| CN | 112073749 A | 12/2002 |
| CN | 101794528 A | 8/2010 |

(Continued)

OTHER PUBLICATIONS

Coburn J. et al.; "Interpolating Three-Dimensional Kinematic Data Using Quaternion Splines and Hermite Curves"; Brown Medical School, Rhode Island, Apr. 1, 2005.

(Continued)

*Primary Examiner* — Peter Hoang
(74) *Attorney, Agent, or Firm* — EIP US LLP

(57) ABSTRACT

Disclosed is a method for generating a sign language transition animation of a character. The method comprising selecting a first animation corresponding with a first signed word and a second animation corresponding with a second signed word, and generating a transition animation to transition the character between the first animation and the second animation.

43 Claims, 9 Drawing Sheets

(56) References Cited

U.S. PATENT DOCUMENTS

| | | |
|---|---|---|
| 2004/0196301 A1 | 10/2004 | Isner |
| 2004/0227760 A1 | 11/2004 | Anderson et al. |
| 2006/0134585 A1 | 6/2006 | Adamo-Villani et al. |
| 2009/0012788 A1 | 1/2009 | Gilbert et al. |
| 2011/0285727 A1 | 11/2011 | Fernandez et al. |

FOREIGN PATENT DOCUMENTS

| | | |
|---|---|---|
| CN | 104732590 A | 6/2015 |
| CN | 104867171 A | 8/2015 |
| JP | 2011175598 A | 9/2011 |
| JP | 2016062528 A | 4/2016 |
| KR | 100730573 B1 | 6/2007 |
| KR | 20120134197 A | 12/2012 |
| KR | 102167760 B1 | 10/2020 |
| KR | 20210026006 A | 3/2021 |
| RU | 2420806 C2 | 6/2011 |

OTHER PUBLICATIONS

Dam E. et al.; "Quaternions, Interpolation and Animation"; University of Copenhagen, Denmark, Jul. 17, 1998.
Shoemake, Ken: "Animating rotation with quaternion curves"; vol. 19, No. 3, Jul. 22, 1985.
Courty N. et al.; "Why is the creation of a virtual signer challenging computer animation?"; Nov. 1, 2010.
Van Welbergen H. et al.; "Real-time animation using a mix of physical simulation and kinematics" Mar. 1, 2010.
Agrawal S. et al.; "Diverse motion variations for physics-based character animation"; 2013.
Grassman R. et al.; "Quaternion-Based Smooth Trajectory Generator for Via Poses in SE(3) Considering Kinematic Limits in Cartesian Space" Oct. 1, 2019.
Goodsit J. et al.; "Interpolation of three dimensional kinematics with dual-quaternions"; Oct. 21, 2016.
Yang, Y., et al.; "Statistics-based Motion Synthesis for Social Conversations", vol. 39 (2020), No. 8 Proceedings of the 2020 ACM SIGGRAPH/Eurographics Symposium on Computer Animation, 2020.
Aristidou, A., et al. "Deep Motifs and Motion Signatures". ACM Trans. Graph., 37(6), Nov. 1, 2018.
Borer, D., et al.; "Animating an Autonomous 3D Talking Avatar". arXiv [Cs.HC]. Retrieved from http://arxiv.org/abs/1903.05448, Mar. 13, 2019.
Holden, D., et al. "Learned Motion Matching ACM Trans. Graph", 39(4). doi: 10.1145/3386569.3392440, Jul. 1, 2020.
Bollo, D., "Inertialization—High Performance Animation Transitions in Gears of War" Presentation at GDC the Coalition—Microsoft Studios, Mar. 19, 2018.
Holden, D., et al. "Phase-Functioned Neural Networks for Character Control". ACM Trans. Graph., 36(4). doi:10.1145/3072959. 3073663, Jul. 1, 2017.
Yang, M., et al. "A multimodal approach of generating 3D human-like talking agent". J Multimodal User Interfaces 5, 61-68, https://doi.org/10.1007/s12193-011-0073-5, Nov. 10, 2011.
Kuffner, J. J. "Effective sampling and distance metrics for 3D rigid body path planning". IEEE Xplore. https://doi.org/10.1109/ROBOT. 2004.1308895, Apr. 1, 2004.
Agrawal, S., et al., "Diverse motion variations for physics-based character animation". CiteSeer X (the Pennsylvania State University). https://doi.org/10.1145/2485895.2485907, 2013.
Coburn, J., et al. "Interpolating Three-Dimensional Kinematic Data Using Quaternion, Splines and Hermite Curves". Journal of Biomechanical Engineering, 127(2), 311-317. https://doi.org/10.1115/1. 1865195, 2004.
Kovar, L., et al., "Motion Graphs". ACM Trans. Graph., 21(3), 473-482. doi: 10.1145/566654.566605, 2002.
Thorne, M., et al., "Motion Doodles: An Interface for Sketching Character Motion". ACM Trans. Graph., 23(3), 424-431. doi:10. 1145/1015706.1015740, 2004.
C. Rose et al., "Verbs and adverbs: multidimensional motion interpolation," in IEEE Computer Graphics and Applications, vol. 18, No. 5, pp. 32-40, doi: 10.1109/38.708559, Sep. 1998.
D. J. Wiley and J. K. Hahn, "Interpolation synthesis of articulated figure motion," in IEEE Computer Graphics and Applications, vol. 17, No. 6, pp. 39-45, doi: 10.1109/38.626968, Nov. 1997.
International Search Report and Written Opinion dated Jan. 23, 2023 for International Application No. PCT/NZ2022/050133.
Naert, L. et al., "Coarticulation Analysis for Sign Language Synthesis", International Conference on Universal Access in Human-Computer Interaction, Vancouver, Canada, 2017.
Naert, L. et al., "A Survey on the Animation of Signing Avatars: From Sign Representation to Utterance Synthesis", Computers & Graphics, vol. 92, Feb. 11, 2020.
International Preliminary Report on Patentability dated Jul. 5, 2023 for International Application No. PCT/NZ2022/050133.
Filhol, Michael, "Zebedee: a lexical description model for Sign Language synthesis", LIMSI, Jul. 6, 2009.
Australian Examination report dated Aug. 10, 2023 for Australian Application No. 2022379381.
Australian Examination report dated Aug. 31, 2023 for Australian Application No. 2022379381.

End of first animation

Start of second animation

Transition path of transition animation

METHOD FOR GENERATING ANIMATED SENTENCES FOR SIGN LANGUAGE TRANSLATION

CROSS-REFERENCE TO RELATED APPLICATIONS

This application is a 371 of International Application No. PCT/NZ2022/050133, filed Oct. 28, 2022, which claims priority to New Zealand Application No. 781756 filed Oct. 29, 2021 under 35 U.S.C. § 119(a). Each of the above-referenced patent applications is incorporated by reference in its entirety.

FIELD OF TECHNOLOGY

The present invention relates to Computer Graphics, in particular, a method for creating transition animations between animations (for example sign language word animations).

BACKGROUND

Sign language is an extremely visual language, with intricate details when it comes to body and finger movement, and facial expressions. Sign language may be communicated by a sign language interpreter, for example by interpretation of a spoken language in sign language.

Animation of sign language exists for example by motion capture of a sign language interpreter but may require significant amounts of manual processing to achieve a useful result.

It is an object of the invention provide an improved method of generating animation which addresses or ameliorates one or more disadvantages or limitations associated with the prior art, or at least to provide the public with a useful choice.

SUMMARY

In a first aspect, there is provided a method for generating a sign language transition animation of a character, the method comprising:
  selecting a first animation corresponding with a first signed word and a second animation corresponding with a second signed word,
  generating a transition animation to transition the character between the first animation and the second animation, wherein the transition animation comprises a transition path for one or more bones of the character,
  generating the transition path for each bone of the one or more bones by:
  calculating kinematic boundary conditions for the transition path for the bone based on the first animation and the second animation, and
  calculating the transition path for the bone based on the kinematic boundary conditions.

In some examples, the kinematic boundary conditions for the transition path of each bone of the one or more bones comprise first animation kinematic boundary conditions associated with the first animation, and second animation kinematic boundary conditions associated with the second animation.

In some examples, the first animation kinematic boundary conditions are calculated at or near an end of the first animation.

In some examples, the second animation kinematic boundary conditions are calculated at or near a start of the second animation.

In some examples, the first animation kinematic boundary conditions are calculated at a time during the first animation and the second animation kinematic boundary conditions are calculated at a time during the second animation.

In some examples, the transition animation is generated from the time during the first animation and/or to the time during the second animation.

In some examples, the first animation kinematic boundary conditions associated, comprise any one or combination of:
  an orientation of each bone in the first animation,
  a velocity of each bone in the first animation, and/or
  an acceleration of each bone in the first animation.

In some examples, the second animation kinematic boundary conditions, comprise any one of combination of:
  an orientation of each bone in the second animation,
  a velocity of each bone in the second animation, and/or
  an acceleration of each bone in the second animation.

In some examples, the acceleration and the velocity of each bone is calculated by numerical differentiation of finite differences.

In some examples, the acceleration of each bone is based on a correction factor which is proportional to the velocity of each bone, and an axis component of the orientation.

In some examples, the kinematic boundary conditions are defined as quaternions.

In some examples, the transition path is shortest path between a or the orientation of the bone in the first animation, and a or the orientation of the bone in the second animation.

In some examples, a transition path time for each transition path is calculated, In some examples, a transition time for the transition animation determined based on a longest transition path time of all transition paths.

In some examples, the transition path time for each transition path is calculated based on a distance travelled by the bone between the first animation and the second animation.

In some examples, the transition path time for each transition path is calculated based on a difference in a quaternion angle component of: an orientation of the first kinematic boundary conditions and an orientation of the second kinematic boundary conditions.

In some examples, the transition path time for each transition path is calculated based on a bone constant which is based on a bone type.

In some examples, the transition path for each bone of the one or more bones is calculated per time step.

In some examples, the time step is $$\frac{1}{\text{frame rate}}$$

of the transition animation.

In some examples, the transition paths are defined by an orientation of each bone at each time step.

In some examples, the transition paths are defined by rotation of each bone about a joint.

In some examples, a first animation time of the first animation, a second animation time of second animation and transition time for the transition animation are scaled based on a global time variable.

In some examples, a first animation time of the first animation is scaled based on a first animation time scaling variable.

In some examples, a second animation time of the second animation is scaled based on a second animation time scaling variable.

In some examples, a transition time of the transition animation is scaled based on a transition time animation scaling variable.

In some examples, a finger transition animation between the first animation and the second animation for fingers of at least one hand of the character is calculated based on an easing function.

In some examples, when a distance between a wrist of the at least one hand in the first animation and the wrist of at least one hand in the second animation is greater than a threshold distance, fingers of the hand are interpolated into a neutral hand pose during the hand transition animation.

In some examples, one or more post processing effects are overlaid onto the first animation, second animation and transition animation.

In some examples, the one or more post processing effects comprise a breathing animation.

In some examples, the breathing animation comprises a sinusoidal scaling function.

In some examples, the one or more post processing effects comprise Perlin noise.

In some examples, Perlin noise is generated based on a bone type of each bone.

In some examples, one or more facial animations of the first animation corresponds with the first signed word.

In some examples, one or more facial animations of the second animation corresponds with the second signed word.

In some examples, one or more transition facial animations is played during the transition animation.

In some examples, one or more transition facial animations is an interpolation between an end of one or more facial animations of the first animation and a start of the one or more facial animations of the second animation.

In some examples, the one or more transition facial animations are played on commencement of the transition animation, or independently to the transition animation.

In some examples, the one or more facial animations are played with the corresponding animation.

In some examples, a user interface is provided for a user to select at least the first signed word and the second signed word.

In some examples, the first animation and/or the second animation are selected from a database.

In another aspect, there is provided a system configured to play the first animation followed by the transition animation, followed by the second animation, wherein the transition animation is generated as per any of the above aspects.

In another aspect, there is provided a method of generating an animated sentence in sign language of a character comprising:
  receiving an input of a sentence to be animated comprising a plurality of words,
  selecting a plurality of animations of the character corresponding with each of the plurality of words of the sentence,
  generating transition animations to transition the character between adjacent animations of the plurality of animations, and
  generating the animated sentence by combining the plurality of animations and the transition animations.

In some examples, the animations are selected from a database.

In some examples, adjacent animations are a first animation and a second animation, and the transition animation is generated as per the method as disclosed in any one of above aspects.

In another aspect, there is provided a system comprising:
  one or more processors; and
  memory storing one or more programs,
  wherein the one or more programs comprising instructions for undertaking the method as disclosed in any one of the above aspects.

In some examples, the system comprises a display in communication with the one or more processors configured to display the animations and the transition animations between adjacent animations.

In some examples, the system comprises one or more input devices configured to receive input as to the words to be animated.

In another aspect there is provided, a method for generating a transition animation of a character, the method comprising:
  selecting a first animation and a second animation,
  generating a transition animation to transition the character between the first animation and the second animation, wherein the transition animation comprises a transition path for one or more bones of the character,
  generating the transition path for each bone of the one or more bones by:
  calculating kinematic boundary conditions for the transition path for the bone based on the first animation and the second animation, and
  calculating the transition path for the bone based on the kinematic boundary conditions.

In another aspect, there is provided a method of generating an animated sequence of a character comprising:
  receiving an input of a sequence to be animated comprising a plurality of animations of the character
  generating transition animations to transition the character between adjacent animations of the plurality of animations, and
  generating the animated sequence by combining the plurality of animations and the transition animations.

In another aspect, there is provided a method for generating an animated sentence in sign language with said method consisting of the following steps: Using motion capture to create animations for a dictionary of words; cleaning and standardizing the animations; selecting the required animations or typing the required words to retrieve the required words; generating a transition animation between each word to seamlessly link the words together; generate a transition for the fingers based on the distance to next sign; determining the transition time of facial animations to synchronize with body animations; overlaying post-processing animation effects onto the character.

In some examples, the method may comprise the following steps: deriving a polynomial equation for rotations/quaternions that uses the kinematic boundary conditions for the start and endpoints of the animation; select the second rotation based on the most valid path, checking for closest rotations, human joint limits, and body intersections; calculate numerical derivatives using quaternion axis-angle decomposition for both axis and angle components; calculate transition time using angular distance, angular velocity, and joint constants; apply calculated rotations to joints in local joint space of the skeleton for each time-step over the transition time.

In some examples, the method of calculating the 2nd-order derivative of the axis decomposition of adding the acceleration term, given by Equation 10 when calculating the numerical approximation of acceleration through finite differences.

In some examples, calculating the transition time may use joint kinematic boundary conditions and tagged sign attributes.

In some examples, the sign attribute of one or two-handedness may be used to determine a transition time.

In some examples, the sign attribute of sentiment may be used to determine a transition time.

In some examples, the sign attribute of intensity may be used to determine a transition time.

In some examples, the method may comprise using distance to determine the transition of the fingers.

In some examples, the method may comprise determining when to transition a facial animation so that it can synchronize with the animations of the body, comprising the following steps: playing the facial animation at the same time as the start of a body animation; starting the facial animation transition immediately when it completes the animation; holding the final frame of the face's transition animation until the next body animation begin playing.

The term "axis" as used in this specification means the axis of revolution about which a line or a plane may be revolved to form a symmetrical shape. For example, a line revolved around an axis of revolution will form a surface, while a plane revolved around an axis of revolution will form a solid.

The disclosure may provide a method for producing a lifelike transition animation that enables a seamless transition between two independent animations for creating sentences in sign language on an avatar from a library of animations of individual words. A path that each joint within a humanoid skeleton should follow at each step in time is generated. The body animation and transition timing are subsequently used to determine the transitioning of the face animations to synchronize with what animation is being performed. Post-processing animations are then added onto the existing animation to enhance its realism.

As used herein the term "and/or" means "and" or "or", or both.

As used herein "(s)" following a noun means the plural and/or singular forms of the noun.

For the purpose of this specification, where method steps are described in sequence, the sequence does not necessarily mean that the steps are to be chronologically ordered in that sequence, unless there is no other logical manner of interpreting the sequence.

The term "comprising" as used in the specification and claims means "consisting at least in part of." When interpreting each statement in this specification that includes the term "comprising," features other than that or those prefaced by the term may also be present. Related terms "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the invention may become apparent from the following description which is given by way of example only and with reference to the accompanying drawings.

BRIEF DESCRIPTION OF THE DRAWINGS

Embodiments of the disclosure will be described by way of example only and with reference to the drawings, in which.

DETAILED DESCRIPTION OF PREFERRED EMBODIMENTS

Figure 1A:
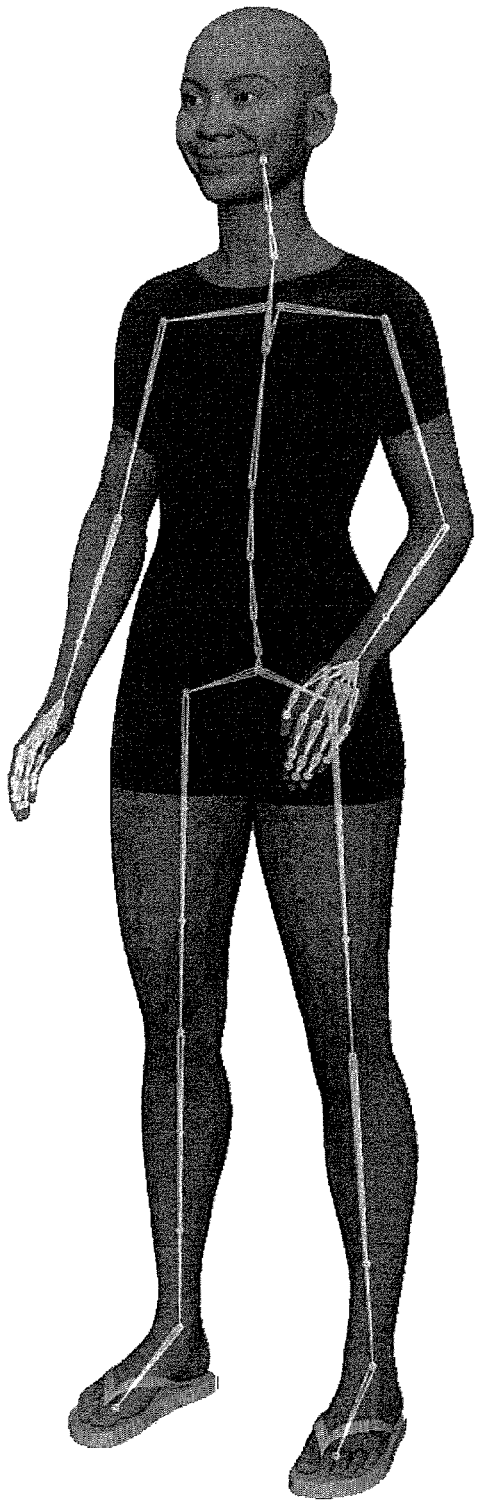
FIG. 1A is a diagram of a character at the end of an example first animation.

The creation of animated sign language content may face challenges in animation quality and scalability. When the quality of a signing avatar does not meet the quality standards, it can result in poor semantics, leading to it becoming a distraction or misinformation. This takes away from the ability to effectively communicate through signing, similarly to how poor spelling and grammar can affect writing communication. This is alleviated through a brute force approach where more time is spent animating individual signs or even entire sentences, which presents an inherent scalability problem.

Existing signing avatars may sacrifice quality to produce a scalable method for translation. This is often done by only using many individual words, each as a separate animation and transitioning between words using one of many existing interpolation methods. These interpolation methods may have drawbacks as discussed in more detail below.

Methods for transitioning between two animations have existed for many years. These include many different types of interpolations: Linear interpolation (LERP), Spherical Linear Interpolation (SLERP), Spherical Quadrangle (SQUAD), and Spherical Interpolation using Numerical Gradient descent (SPRING). LERP and SLERP produce results with rotational discontinuities. SQUAD and SPRING produce a smooth path between two or more points. Several methods for calculating the duration of these interpolations have already been created too. These current methods for producing a three-dimensional rotational interpolation do not take into account the kinematic boundary conditions (velocities, accelerations, duration) when generating the path of the interpolation.

Methods for producing an interpolation path dependent on these kinematic boundary conditions exist in a method called Inertialization. However, this method when applied to rotation does not produce smooth transitions as it is only able to provide a two-dimensional interpolation path rather than the required three. This method only uses initial conditions for calculating a path and does not take into account the final conditions. This means the method requires certain requirements regarding the animations to be met, otherwise resulting in discontinuities within the transitions.

An alternative method for producing smooth transitions is by making use of animation blending. The blend between two playing animations guarantees that no discontinuities will be present. This method requires portions of an animation to be mixed with the animation of another sign. While this is invaluable when transitioning in most use cases, in sign language this can destroy the meaning behind many signs with them being improperly performed.

Recent developments in animation transitions select from a database of pre-recorded animations, to produce smoother transitions in conjunction with the previously mentioned interpolation methods. The methods used for selecting a pre-recorded animation include using selection algorithms or statistical machine learning to select an animation from the database that provides the best transition from the current animation.

Scalable and high-quality sign language animation generation is not present in previous works. Due to the quality requirements, it is extremely difficult to produce a large enough library of pre-recorded animations to select from to account for every possible transition that could occur. Methods driven by large amounts of data are also impractical, due to the need for each animation requiring a large amount of time spent by an animator cleaning and polishing it up. Standard interpolation methods also do not produce acceptable results as they result in non-natural movement and incorrect sign performance.

The present disclosure may provide a method of generating a transition from one sign animation to the next in an automated process that enhances the naturalness of this transition wherein the same can be utilized for the generation of sentence animation in sign language from individual word animations.

The present disclosure describes a system for selecting words to be chained together to form a sentence. A transition animation is generated in between each chosen word. A path for each joint in the skeleton is calculated as a time-dependent equation by using the animation's kinematic boundary conditions. Post-processing effects are then added to this animation to enhance the realism of these generated transitions.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of other embodiments and of being practiced and carried out in various ways. Also, it is to be understood that the phraseology and terminology employed herein are for the purpose of the description and should not be regarded as limiting.

The present disclosure may provide a scalable method for creating high-quality sign language content that will overcome the shortcomings of the prior art.

The present disclosure may provide a method for generating transition animation. Another objective is to provide a transition animation that can respect its kinematic boundary conditions when generating a path between two animations.

The present disclosure may provide a system of modifying the transition animation based on the properties of a sign animation.

The present disclosure may provide a system of improving the realism of an animation by reproducing the life-like subtleties in the movement of motion-captured animation.

The present disclosure may provide a system that is able to synchronize facial animations with the animations and generated transitions of the body.

Other potential objectives and advantages of the present disclosure will become obvious to the reader and it is intended that these objects and advantages are within the scope of the present invention.

Animations for signed words may be required for the final output. In some examples of this disclosure these animations are created by recording a signer signing individual words using motion capture technology. This preserves the subtleties of human movement within the created animations, making for a more realistic digital avatar. In these examples the animations may be manually cleaned as needed to account for any errors that emerge from the motion capture process. In other examples, the animations may be generated using processes known in the art (for example via software).

Once the animations match the intended movements of the source signer, a standardization process is followed. The spine within the humanoid skeleton is standardized across all animations with a neutral animation as during motion capture, the signer's spine may shift quite significantly between words. This unnecessary movement needs to be removed while preserving any natural spine movement during a sign or intended movement that is part of the sign. Next, the velocity of an animation can be normalized using a mapping function that takes extreme ends of the velocity of a sign and maps it to an average value/range. This prevents any fluctuations in speed between recorded signs causing large changes in sign speed between two sequential words. These animations should then be stored in a database with tags specifying attributes about the sign such as but not limited to sign one-handedness, sign sentiment, and sign intensity.

Animations to link together into a sequence may then be selected from the database through appropriate means. One example would be through a graphical user interface as shown in FIG. 1 (described in more detail below).

A character (for example represented by a humanoid skeleton) has a first animation $A_1$ that is driving the bones of a character. The first animation may correspond with a first signed word. On completion of this animation, the next animation i.e. a second animation $A_2$ needs to seamlessly be transitioned into. The second animation may correspond with a second signed word.

The term bones is used to describe an element of an animated object (for example a character) and/or a character mesh. A bone can represent a higher-level motion of the part of the character (and for example a character's mesh) it is influencing. In some cases, the bones may be hierarchical or interconnected and can correspond to specific bones of a humanoid skeleton. Bones may be connected to one or more joints and be constrained to only rotate about the associated joint(s). The model may comprise other model constraints (for example to ensure correct placement of clothing or other surfaces of the model), the transition path may not be calculated for these constraints.

The bones may be manipulated in a number of ways for example being scaled, translated, rotated etc. In some examples, the bone may be rigid.

FIGS. 1A-1C and 2 show an example of a character with a number of bones.

The animations may comprise transition paths for one or more bones of the character.

In some examples, the first animation $A_1$ is completed before transitioning to the second animation $A_2$, however in other examples Animation $A_1$ does not need to complete to initiate a transition. If the transition is initiated while an animation is playing or midway through a transition, a buffer, tracking the history of a character's position (for example bone locations and/or joint rotations may be used). This may be used in cases where the transitions are required to be dynamic and won't be guaranteed to play in an uninterrupted sequence.

A transition animation $A_t$ is generated to transition the character between the first animation $A_1$ and the second animation $A_2$. The transition animation $A_t$ can be defined by a number of transition paths for one or more bones of the character. It will be appreciated that in some examples not all of the bones of the character may move in a transition animation $A_t$.

Figure 1B:
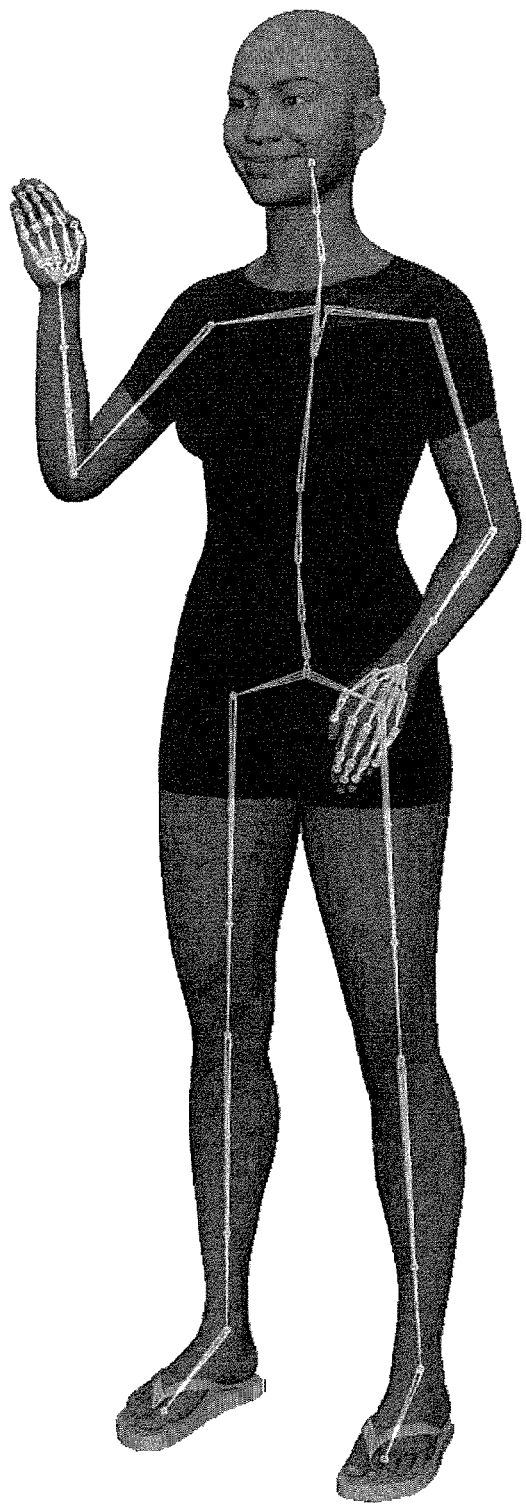
FIG. 1B is a diagram of a character at the start of an example second animation.

FIG. 1A shows an example of a character at the end of a first animation $A_1$. FIG. 1B shows the character at the start of the second animation $A_2$. The transition animation needs to be generated to transition from the end of the first animation A to the start of the second animation $A_2$. In this example only the right arm of the character needs to move, and the rest of the character remains stationary.

The animation has kinematic boundary conditions, defined in part by the later movement of the animation for the first animation, and the earlier movement of the animation for the second animation.

Figure 1C:
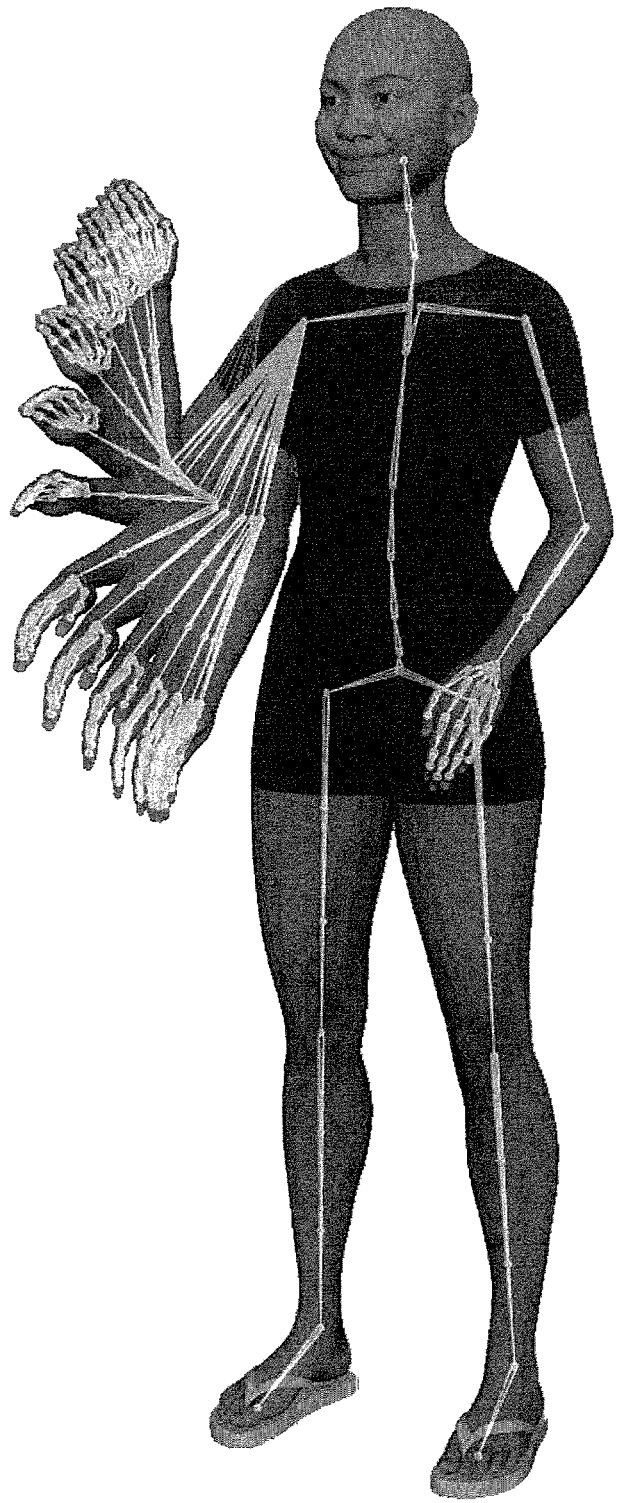
FIG. 1C is a diagram of a character moving through the transition path of a transition animation.
Figure 2:
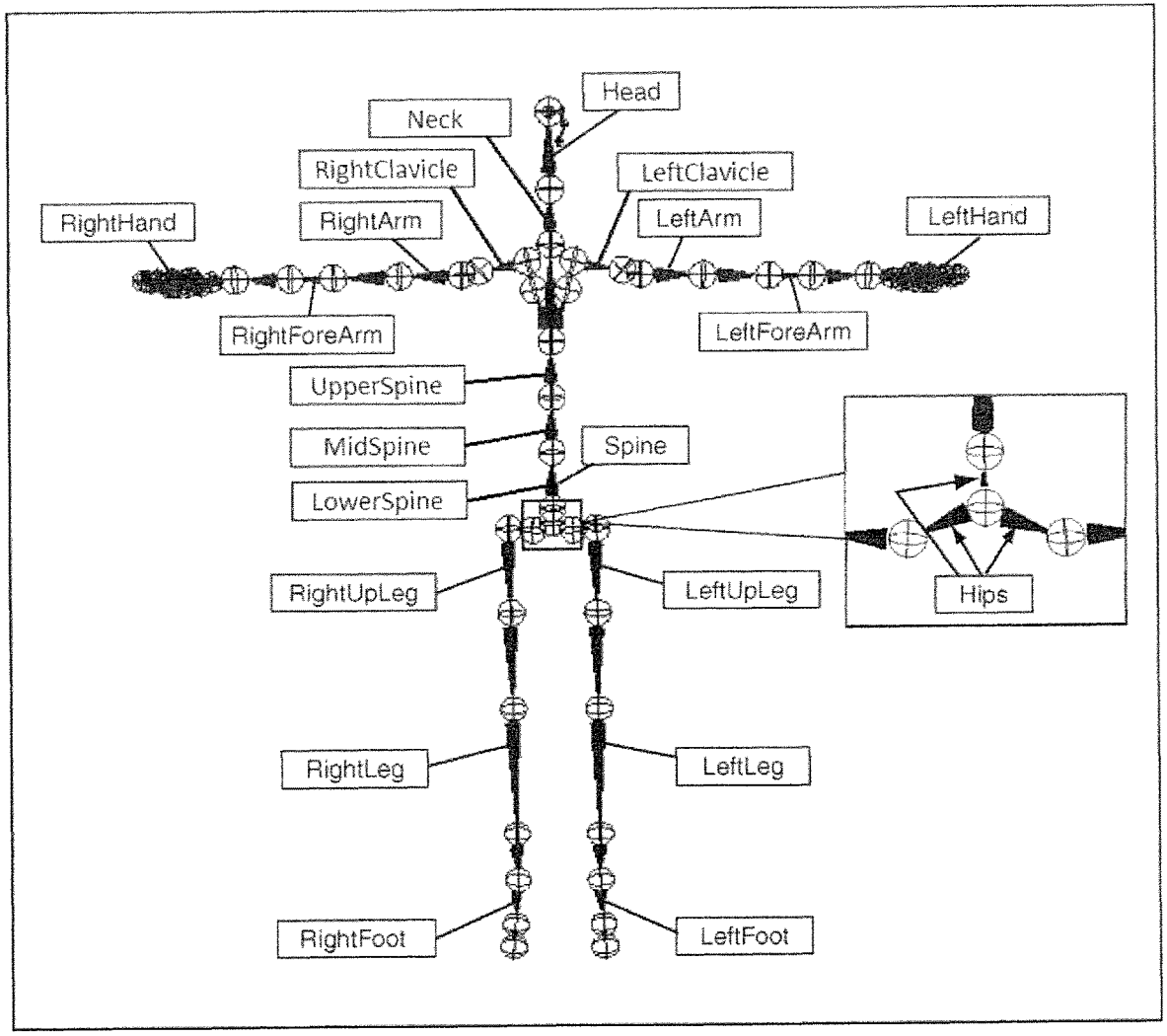
FIG. 2 is a diagram illustrating examples of the names and locations of bones required within the skeleton.

FIG. 1C shows an example of a transition path (shown in ghost) for the transition animation. The distance between each ghost illustrates the amount of movement at each time step. From this it can be seen that the bones in the character's arm are moving faster at the middle of the transition animation. It can also be seen that the transition path is a curved path, following final trajectory of the first animation, and starting trajectory of the second animation. This gives a more natural appearance as compared to for example a linear interpolation where the speed of the arm would be constant through the transition animation.

Figure 3:
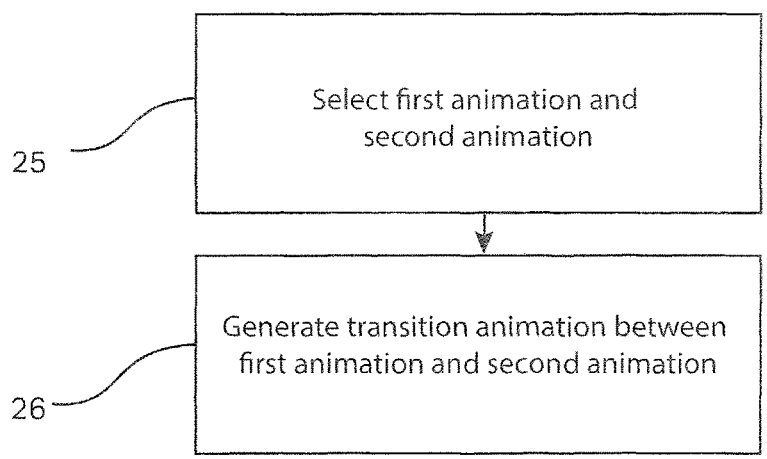
FIG. 3 is a flowchart illustrating the generation of a transition animation based on a first animation and a second animation.

FIG. 3 shows an example flow diagram of generating the transition animation. At step 25, the first animation $A_1$ and second animation $A_2$ are selected. At step 26 the transition animation is generated between the first animation $A_1$ and second animation $A_2$.

The transition path may be defined in any suitable number system for example: Euler angles or Quaternions. The example implementation below uses quaternions. Quaternions may be beneficial as they do not suffer from Gimbal lock, and any paths can be easily computed using common computer systems.

The quaternions used in the method described below may be represented in the form: as shown below:

$$w + xi + yj + zk$$

Where w is the scalar part, and $xi+yj+zk$ the imaginary part.

The quaternion may also be represented as a combination of an angle around an axis in the from as shown below:

$$\cos\left(\frac{\theta}{2}\right) + \sin\left(\frac{\theta}{2}\right)(xi + yj + zk)$$

Where $\theta$ is the angle, and $xi+yj+zk$ is the axis component.

Figure 4:
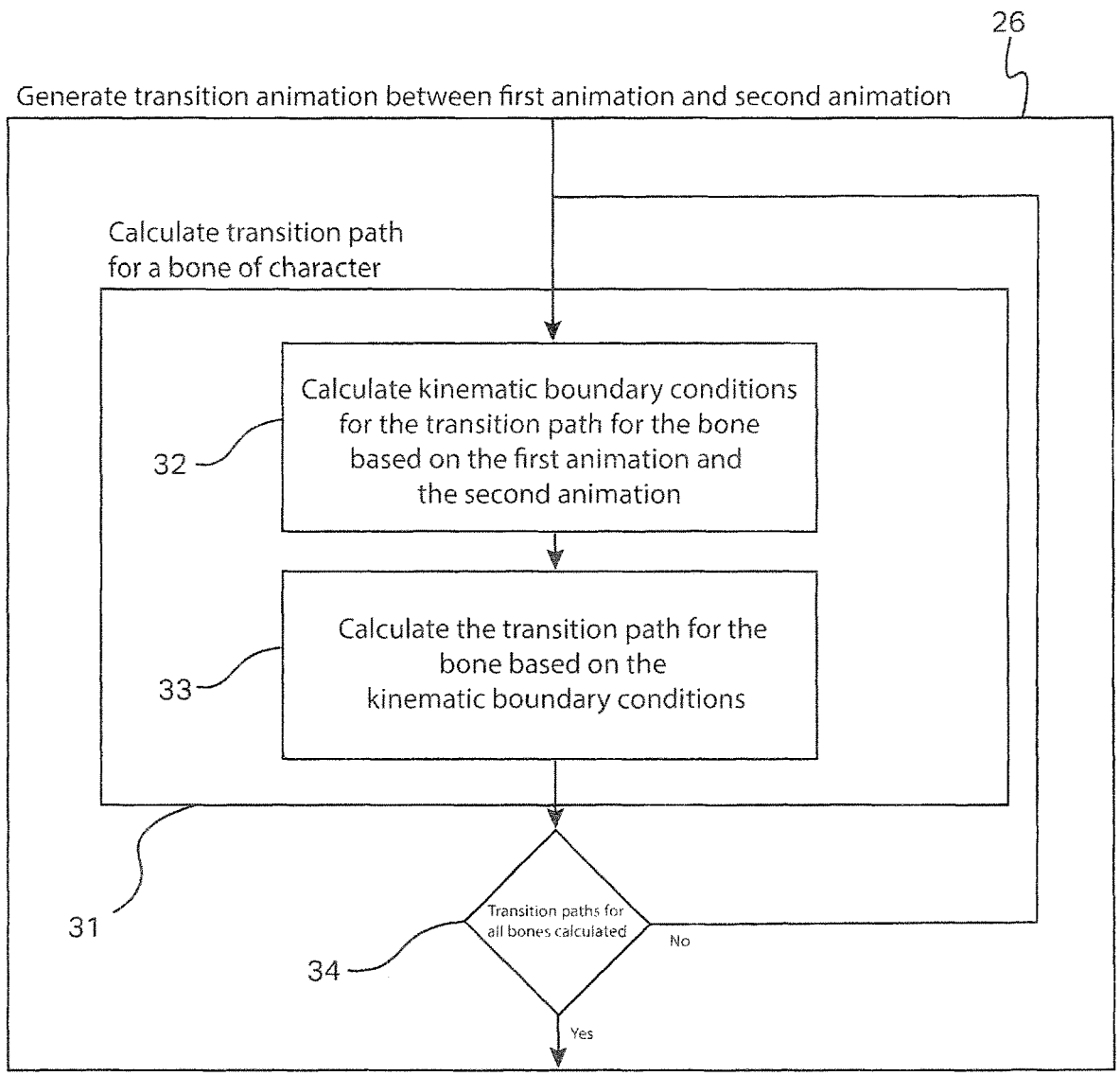
FIG. 4 is a flowchart illustrating the generation of a transition animation.

FIG. 4 shows an example of the generation of the transition animation.

At step 31, a transition path is calculated for a bone of a character. At step 32, kinematic boundary conditions for the transition path for the bone are calculated based on the first animation and the second animation. At step 33 the transition path is calculated based on the kinematic boundary conditions. At step 34, if all the transition paths have been calculated for all the desired bones have been calculated the transition animation is generated, if not the transition path for the next bone may be calculated. It will be appreciated that the transition paths for the bones may be calculated in parallel.

To generate a transition animation a rotational path needs to be created for each bone for each time step in the 3D engine before $A_2$ is played. Depending on the use case of the animation, this method may be applied to all bones. For bones not using this calculated transition, any standard interpolation method should be used. In the use case of sign language, this transition is not used on all joints within the hands (for example the fingers) and an easing function, or any other interpolation function (for example linear interpolation) may be used.

The easing function may be an easing out function. The easing out function may allow for the fingers of the hand to decelerate as they reach their final position. A sinusoidal out easing curve is used.

Using an easing function may make movement of the fingers of the hand appear more natural, than for example a linear interpolation.

The transitions path defines a pathway for each bone of the character from an initial orientation $q_1$ of the first animation $A_1$ and a final orientation $q_2$ of the second animation $A_2$.

The orientation $q_1$ of the first animation $A_1$ may be the final orientation of the bone in the first animation $A_1$, or an orientation near the end of the first animation $A_1$, or any orientation in the first animation $A_1$.

The orientation $q_2$ of the second animation $A_2$ may be the final orientation of the bone in the second animation $A_2$, or an orientation near the end of the second animation $A_2$, or any orientation in the second animation $A_2$.

The transition path for the rotation of each joint, needs to rotate through from an initial orientation $q_1$ (at the end, or near the end, of the first animation—for example as shown in FIG. 1A) to a final orientation $q_2$ (at the start, or near the start, of the second animation—for example as shown in FIG. 1B).

First, select $q_2$ so that SLERPing between $q_1$ and $q_2$ returns the shortest path given by Equation 1.

$$q_2 = \begin{cases} q_2, & \text{if } q_1 \cdot q_2 \geq 0, \\ -q_2, \end{cases} \quad (1)$$

For example, in Equation 1, if the dot product of $q_1$ and $q_2$ is positive then $q_2$ is used. Otherwise $-q_2$ is used. The dot product of $q_1$ and $q_2$ being positive leads to the shortest path.

$q_2$ and $-q_2$ may be checked against joint limits and joint collisions for the character.

$q_1$ and $q_2$ are broken down into their axis $\bar{e}$ and angle $\theta$ components to provide a simpler method of working with four-dimensional associative normed division algebra. This enables the application of standard algebra into four-dimensions when calculating the required path. The general equation for a $5^{th}$-order polynomial equation as given by Equation 2 is used to calculate the required axis and angle for the transition at each time step. This equation may be modified to account for collision between bones. For example, each transition path may be checked against joint limits and joint collisions.

Kinematic boundary conditions may be calculated for the transition path for each bone. The kinematic boundary conditions define the kinematic conditions of the animation at the start and end of the transition animation $A_t$ for each bone.

Figure 5:
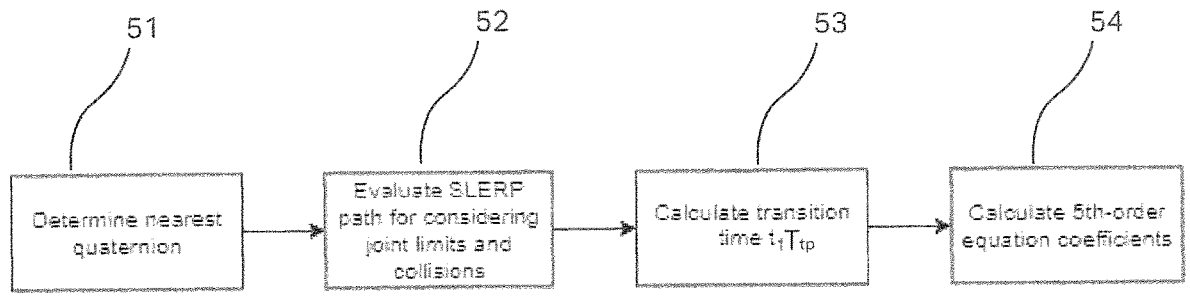
FIG. 5 is a flowchart illustrating the steps required to calculate the transition equation to be evaluated to determine one or more transition paths.

FIG. 5 shows an example flow diagram for determining the transition path for a bone.

At step 51, the nearest orientation of $q_2$ and $-q_2$ from $q_1$ is selected (as described above).

At step 52, joint collisions and limits are considered.

At step 53, the transition path time is calculated (as described in more detail below)

At step 54, the kinematic boundary conditions are used to determine the transition path.

The kinematic boundary conditions may comprise kinematic boundary conditions associated with the first animation, and second animation kinematic boundary conditions associated with the second animation.

The first animation kinematic boundary conditions may be calculated at or near an end of the first animation.

The second animation kinematic boundary conditions are calculated at or near an end of the first animation.

Figure 7:
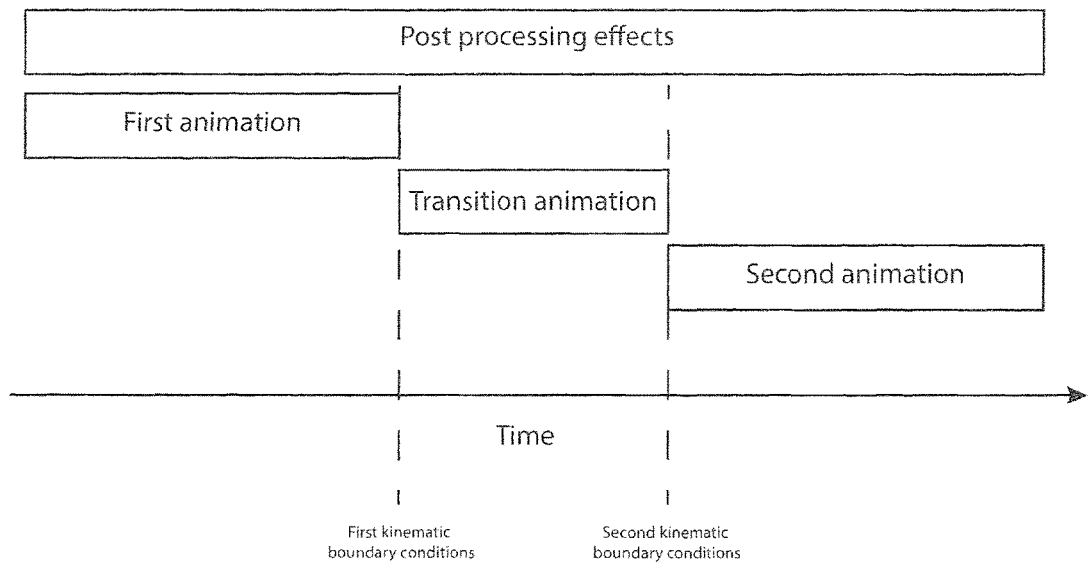
FIG. 7 is a diagram illustrating post processing effects, and how the first animation, second animation and transition animation are ordered.

In some examples, for example as shown in FIG. 7, the first animation kinematic boundary conditions is/are calculated at the end of the first animation, and the second animation kinematic boundary conditions is/are calculated at the end of the second animation.

The kinematic boundary conditions may be calculated at any time during the respective animation(s) for example where the transition animation is to be generated from a time during the first animation and/or to a time during the second animation. For example, if the transition animation $A_t$ is to be generated 1 second into the first animation $A_1$ the first kinematic boundary conditions may be calculated at this time.

The kinematic boundary conditions may comprise any one or combination of: an orientation of each bone in the first animation at or near an end of the first animation, a velocity of each bone in the first animation at or near an end of the first animation, an acceleration of each bone in the first animation at or near an end of the first animation, an orientation of each bone in the second animation at or near a start of the second animation, a velocity of each bone in the second animation at or near a start of the second animation, and an acceleration of each bone in the second animation at or near a start of the second animation. It will be appreciated that in some examples not all of the kinematic boundary conditions may be used in calculating the transition path. In the example below all the above kinematic boundary conditions are used in calculating the transition path.

The coefficients for Equation 2 can be evaluated by calculating the kinematic boundary conditions for the transition and evaluating Equations 3, 4, 5, 6, 7, 8.

Equation 2 calculates an orientation q(t) between $q_1$ and $q_2$ of each bone at time t. The time t is defined as the time from the beginning of the transition animation. In some examples, the equation 2 may be calculated at each time step (as described in more detail below). In examples where for example Euler angles are utilised, the transition path may be defined by rotation of the bone about a joint.

Equations 3, 4, 5, 6, 7, 8 take into account the kinematic boundary conditions (in quaternion form), the first kinematic boundary conditions: $q_1$-orientation, $v_1$-velocity $a_1$-acceleration, and the second kinematic boundary conditions: $q_2$-orientation, $v_2$-velocity $a_2$-acceleration.

The Equations also take into account the transition path time $t_{tp}$ for the transition path.

$$q(t) = At^5 + Bt^4 + Ct^3 + Dt^2 + Et + F \quad (2)$$

$$A = \frac{-a_1 t_{tp}^2 + a_2 t_{tp}^2 - 6t_{tp}v_1 - 6t_1 v_2 - 12q_1 + 12q_2}{2t_{tp}^5} \quad (3)$$

$$B = \frac{3a_1 t_{tp}^2 - 2a_2 t_{tp}^2 + 16t_{tp}v_1 + 14t_{tp}v_2 + 30q_1 - 30q_2}{2t_{tp}^4} \quad (4)$$

$$C = \frac{-3a_1 t_{tp}^2 + a_2 t_{tp}^2 - 12t_{tp}v_1 - 8t_{tp}v_2 - 20q_1 + 20q_2}{2t_{tp}^3} \quad (5)$$

$$D = \frac{a_1}{2} \quad (6)$$

$$E = v_1 \quad (7)$$

$$F = q_1 \quad (8)$$

The transition path time $t_{tp}$ for each transition path may be calculated based on a difference in a quaternion angle component of an orientation $q_1$ of the first kinematic boundary conditions and an orientation $q_2$ of the second kinematic boundary conditions.

The transition path time $t_{tp}$ is calculated by evaluating Equation 9 for each bone the transition will be applied to. The transition time for the transition animation is determined based on a longest transition path time of all transition paths (for example the maximum found value after evaluating each bone).

Figure 6:
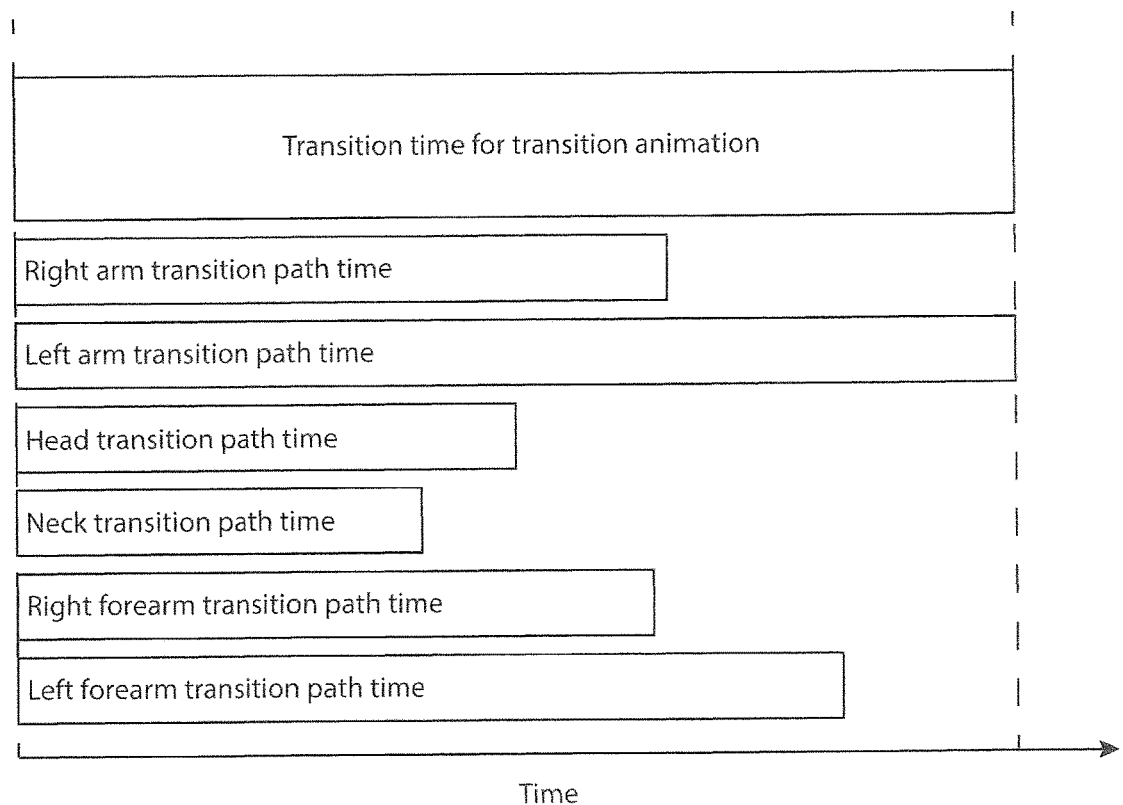
FIG. 6 is a diagram illustrating the determination of the transition time for the transition animation.

An example of determining the transition time for the transition animation is shown in FIG. 6. A selection of transition path times are shown for particular bones. The longest of these the left arm transition time is the longest, and therefore taken to be the transition time for the transition animation.

Equation 9 may include but is not limited to parameters including kinematic boundary conditions, sign location such as whether the sign is around the body or face, sign emotive intent such as whether the sign should convey emotions like excitement or boredom, or sign one-handedness. For the case of sign one-handedness, a method of desynchronization between both hands needs to be considered in addition to each hand's transition time.

$\theta_{tp}$ in equation 9 is the difference in the angle component (as described in more detail above) of orientations $q_1$ and $q_2$ This is indicative of the distance travelled by the bone.

$$t_{tp}=0.6J\theta_{tp}^{0.37} \quad (9)$$

Where J is given by Table 0.1

TABLE 0.1

| Bone | J |
|---|---|
| Spine | 1 |
| Neck | 1 |
| Clavicle | 0.8 |
| Arm | 1 |
| Forearm | 1 |
| Hand | 0.8 |

To calculate the boundary conditions for the $\bar{e}$ and $\theta$, numerical differentiation using finite differences is used to approximate these derivatives using the animation data at the end of $A_1$ and the start of $A_2$. When calculating acceleration, the unit quaternion constraint must be taken into account. For $\bar{e}$, an additional acceleration term is added as given by Equation 10 This approximates the enforcement of the unit quaternion constraint when working with $\bar{e}$. Without this additional term the mathematics becomes invalid, however this correction term is only an approximation but allows bypassing larger computational requirements when applying quaternions to kinematic equations.

In Equation 10 the acceleration $\bar{a}_n$ is the correction factor for the axis part $\bar{e}$ of either $a_1$ or $a_2$. The velocity is the corresponding velocity $v_1$ or $v_2$ and $\bar{e}$ is the corresponding axis part of the orientation $q_1$ or $q_2$.

$$\bar{a}_n = -|\bar{v}|^2 \bar{e} \quad (10)$$

The number of points used when calculating the derivatives through finite differences should be dependent on the frame rate to get an accurate approximation. For animations of 24 frames per second, a 2-point difference is sufficient with a step size of $\frac{1}{24}$ seconds.

The transition can then be calculated by evaluating the equation to return the local rotation of each joint at each time step. This is done across the range from $t=\Delta t$ to $t=t_1-\Delta t$ at which point $A_2$ can then start playing.

In some examples, the speed at which each animation is played may be scaled, and/or the speed at which all the animation play is scaled.

In some examples, scaling may be undertaken before the transition animation is generated, as scaling the adjacent animations may change the kinematic boundary conditions.

For example, a first animation time of the first animation $A_1$, a second animation time of second animation $A_2$ and transition time for the transition animation $A_t$ are scaled based on a global time variable.

Additionally, or alternatively, a first animation time of the first animation $A_1$ is scaled based on a first animation time scaling variable.

Additionally, or alternatively, a second animation time of the second animation $A_2$ is scaled based on a second animation time scaling variable.

Additionally, or alternatively, a transition time of the transition animation $A_t$ is scaled based on a transition time animation scaling variable.

As described above, these transitions calculated with kinematic boundary conditions may not be applied to any joints (for example the fingers) within the hands. Instead, an easing function may be used to perform a transition (as described above in more detail). However, the transition of the fingers may be dependent on the linear distance between the wrists between the two animations. The fingers are interpolated into a neutral hand pose for signs where the two animations have a large distance between their wrists as to not introduce any accidental new signs during the transition animation. For short distances, a normal easing curve is used to transition between the two poses (as described above). In some examples, when a distance between a wrist of at least one hand in the first animation (for example an orientation of the wrist in the first animation) and the wrist of the at least one hand in the second animation (for example an orientation of the wrist in the second animation) is greater than a threshold distance, fingers of the hand are interpolated into a neutral hand pose during the hand transition animation.

One or more post processing effects may be overlaid onto the first animation, second animation and transition animation. The post processing effects may be a breathing animation and/or Perlin noise.

An example of this is shown in FIG. 7, where the post processing effects are overlaid across the first animation, second animation and transition animation.

To improve the realism of animation, multiple post-processing animation effects are automatically generated through a set of derived formulae. These are then played along other animation on top of the base animation layer.

In some examples, a breathing animation is overlaid onto the torso of the character by scaling bones in the upper torso given by Equation 11. The scaling factor s is calculated as a sinusoidal function of time t along the x, y, and z axes of the some or all of the bones of the torso of the character.

$$s = \begin{bmatrix} 0.002 \\ 0 \\ 0.02 \end{bmatrix} \sin(1.6t) \quad (11)$$

Perlin noise is added over the transitions and animations so they don't appear robotic. A specific frequency and amplitude to generate the Perlin noise for several bones are given in Table 0.2.

TABLE 0.2

| Bone | Frequency (Hz) | Amplitude (°) |
|---|---|---|
| Lower spine | 0.25 | 0.00637 |
| Mid spine | 0.5 | 0.00478 |
| Upper spine | 0.5 | 0.00478 |
| Neck | 1 | 0.00239 |
| Arm | 1 | 0.00239 |
| Lowerarm | 1.5 | 0.00239 |
| Hand | 2 | 0.00239 |

Facial animations need to be played in conjunction with the animations of the character. The facial animations may be part of the animations or overlaid onto the animations. The facial animations may be a number of facial animations combined.

The facial animations of the animation may correspond to the signed word for the animation. For example, one or more facial animations of the first animation corresponds with the first signed word, and the one or more facial animations of the second animation corresponds with the second signed word.

In some examples, one or more transition facial animations is played during the transition animation. The one or more transition facial animations may be an interpolation between the end of one or more facial animations of the first animation and the start of the one or more facial animations of the second animation. The interpolation may be a linear interpolation.

The one or more transition facial animations may be played to the transition animation.

The one or more transition facial animations may be played on commencement of the transition animation, or for example independently to the transition animation.

Facial animations need to be played in conjunction with the body animations. If possible, the length of these two animations should be the same, however, since there are many cases where they are not without making the signing look unnatural, this requires a method of synchronization.

In some examples, the face animation should be played when a new, for example a corresponding, body animation starts playing. When the face animation finishes, the face animation should immediately begin transitioning to the next face animation. The transition alpha will then be clamped at 100% until the next body animation plays at which point the next face animation can start playing.

In some examples, the play rate of the face animation should not be modified to match its length with the body as this will cause facial expressions to incorrectly match up in timing with its body sign.

Figure 8:
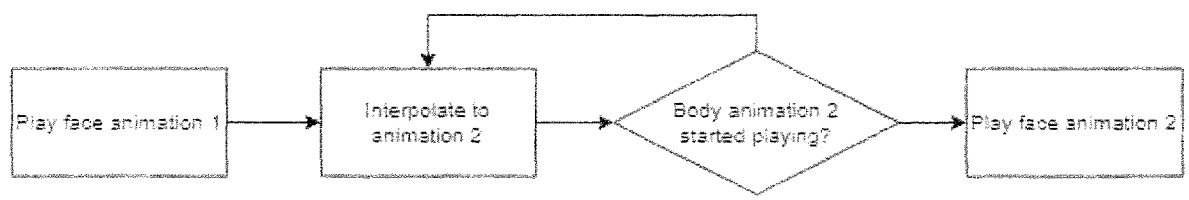
FIG. 8 is a flowchart illustrating the steps to synchronize face animations with the body.

FIG. 8 shows an example of the synchronisation of the face animations with the animation of the body. For example, face animation 1 is played initially (for example with a first animation), and face animation 2 is not played until the animation has transitioned to the second animation.

Often the face animations will be trimmed so that blinking will usually not be contained within the animation. To enhance realism within the face, blinks should be wiped from face animations unless they are contextual. Blinks are then added at random intervals between 2-8 seconds by blending into and out of a blink pose using a sinusoidal curve with a random duration between 0.2-0.3 seconds.

The above disclosure may be used to generate an animated sequence (for example an animated sentence in sign language). For example, an input of a sentence to be animated may be received. The sentence to be animated may comprise a plurality of words.

Figure 9:
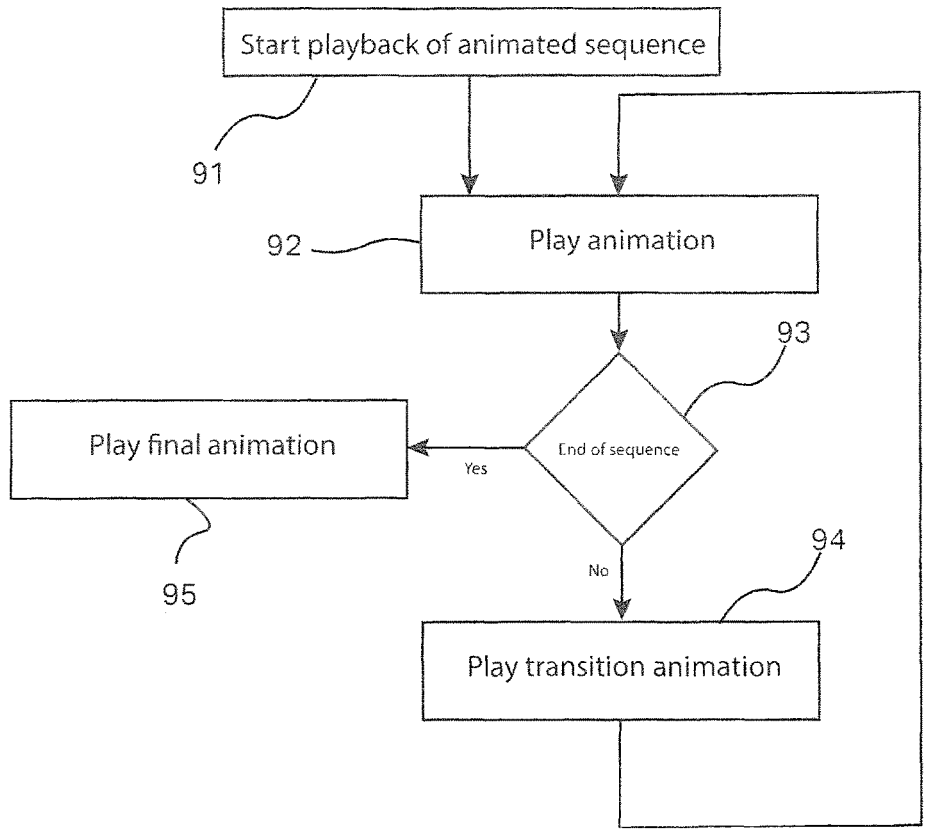
FIG. 9 is a flowchart illustrating the playback of a sequence of animations.

FIG. 9 shows an example of how multiple animations are played to form an animated sequence (for example an animated sentence). At step 91 playback of the animated sequence is started. At step 92, an animation is played (the first time through this process this will be a start animation of the sequence). At step 93, if the sequence is at the end, then the final animation of the sequence will be played at step 95. If the sequence is not at the end, then the transition animation is played at step 94. After the transition animation is played at step 94, the next animation in the sequence is played at step 92.

In some examples, all the transition animations are generated before playback. For example, all the animations may be selected from the database, and all transition animations between the animations may be generated (and optionally post processing effects applied) before playback commences.

In other examples, the transition animations are calculated during playback of the other animations.

Figure 10:
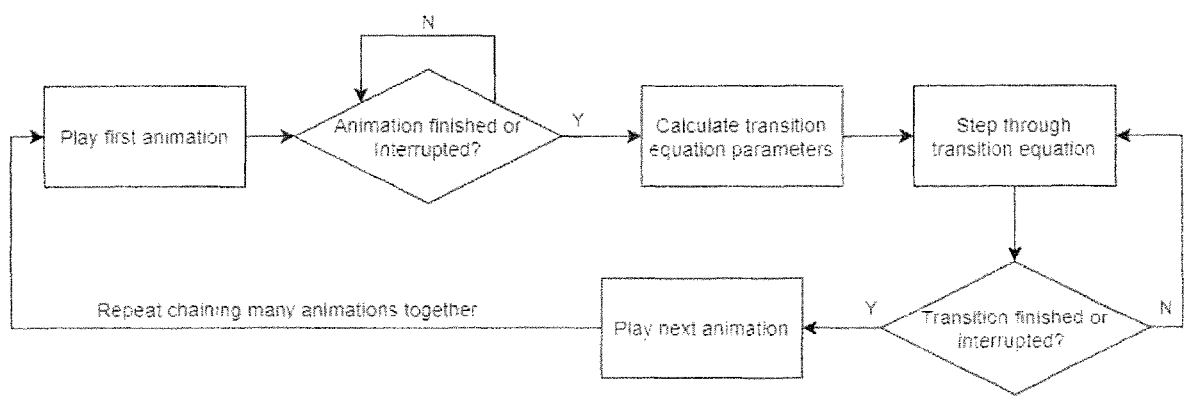
FIG. 10 is a flowchart illustrating the execution of events within the word to sentence program.

FIG. 10 outlines another example of playing a sequence of animations. The first animation is initially played, and once that has completed the transition equation parameters (i.e. equations 5-10) are calculated, and then stepped through until they are completed. The next animation is then played, and the process repeats (with the next animation then becoming the first animation).

Figure 11:
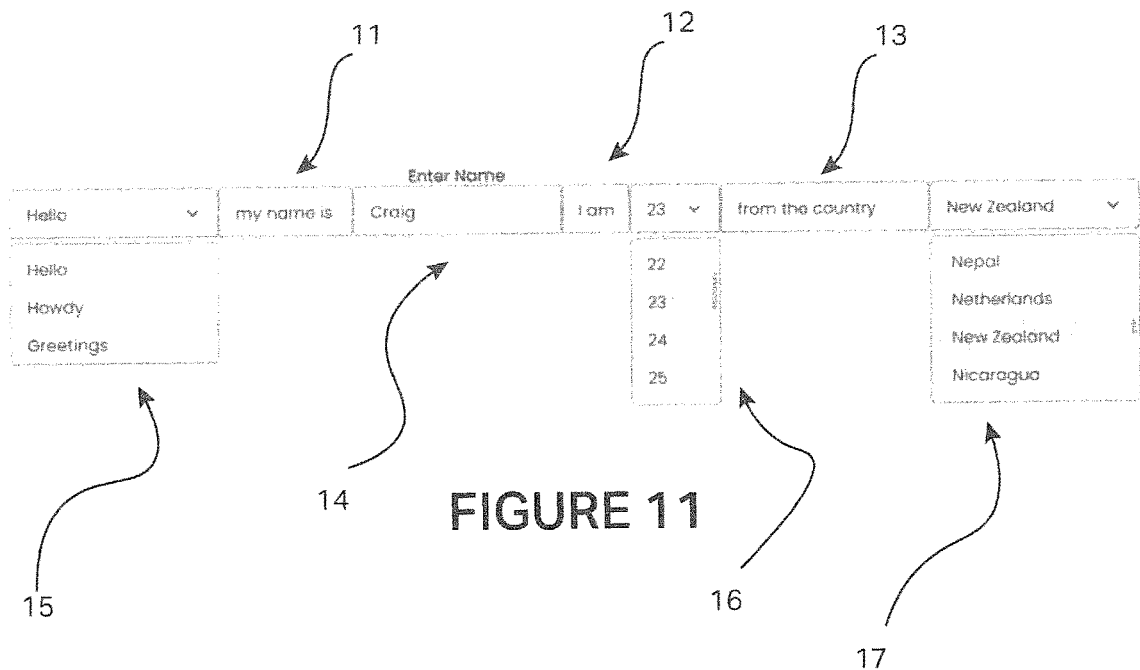
FIG. 11 is an example of a system used to generate multiple variations of a sentence in sign language without requiring to create each variation of the sentence but rather just the individual word components.

A user may for example input the sentence to be animated, or select the words, or phrases of the sentence to be animated from a drop-down list (for example as shown in FIG. 11). In examples, where the animated sequence is not an animated sentence in sign language, the animations may be selected instead of the words or phrases of the sentence.

Referring to FIG. 11, some of the phrases or words of the sentence may be pre-selected (for example 11, 12 and 13), some may have free text entry (for example the 'Name' field 14), and some may have drop down options (for example 15, 16 and 17).

Animations of the character corresponding with each of the plurality of words of the sentence may then be selected. The animations may be selected for example from a database, or other data structure. In some examples, the animations may be provided by a user.

Figure 12:
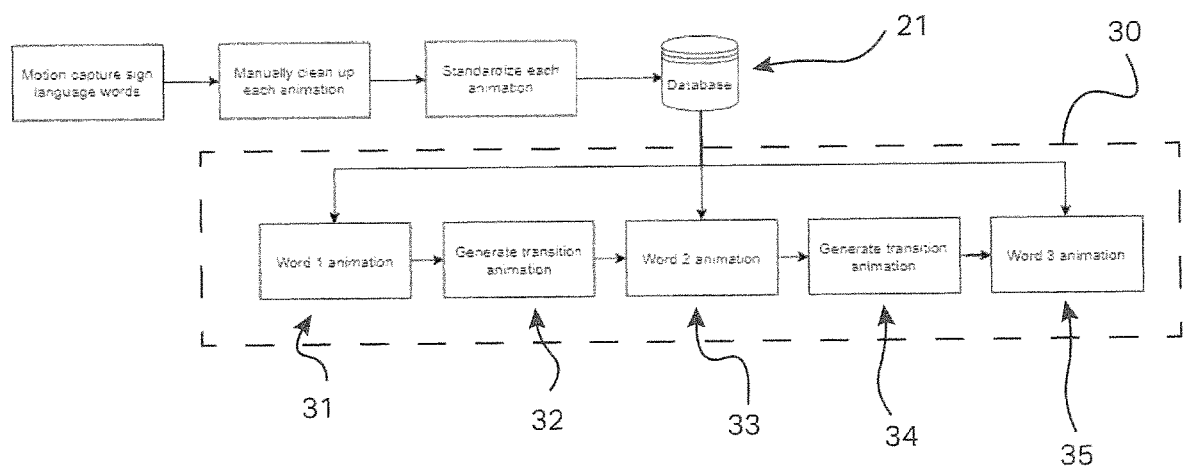
FIG. 12 is a flowchart illustrating the combination of animations with transition animations.

FIG. 12 shows an example on how the database 21 may be populated by using motion capture to capture sign language words, these captures may then be cleaned and standardised and added to the database 21.

Transition animations may then be generated to transition the character between adjacent animations of the plurality of animations. The transition animations may be generated as described above.

The animated sentence may then be generated by combining the plurality of animations and the transition animations.

The animations are ordered in the same order as the words of the sentence.

In the example as shown in FIG. 12, an animated sentence 30 is generated. The animated sentence comprises word 1, word 2 and word 3. Animations relating to each of these words are pulled from database 21. Between each of pair of words a transition animation is generated. For example, a transition animation 32 is generated to transition between the word 1 animation 31 and the word 2 animation 33. Additionally, a transition animation 34 is generated to transition between the word 2 animation 33 and the word 3 animation 35. These animations can then be played in sequence as the animated sentence It will be appreciated that the system may generate a number of animated sentences to animate a portion of the system input. The system input may be for example input that a user may have entered or a text that may have been generated.

The input may for example be the words to be animated, and/or the animations to form the animated sequence.

The methods above may be implemented by a system. The system may comprise one or more processors; and memory storing one or more programs. The one or more programs comprising instructions for undertaking the method above.

The system may comprise one or more input devices configured to receive input at to the words to be animated.

The method above may be used on applications for transitioning between two animations in other applications other than in sign language.

To the accomplishment of the above and related objects, this disclosure may be embodied in the form illustrated in the accompanying drawings, attention being called to the fact, however, that the drawings are illustrative only, and that changes may be made in the specific construction illustrated and described within the scope of the appended claims.

Where in the foregoing description reference has been made to elements or integers having known equivalents, then such equivalents are included as if they were individually set forth.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in a descriptive sense only and not for purposes of limitation, and also the technical scope of the invention is not limited to the embodiments. Furthermore, the present invention is defined not by the detailed description of the invention but by the appended claims, and all differences within the scope will be construed as being comprised in the present disclosure.

Many modifications will be apparent to those skilled in the art without departing from the scope of the present disclosure as herein described with reference to the accompanying drawings.

The invention claimed is:

1. A method for generating a sign language transition animation of a character, the method comprising:
    selecting a first animation corresponding with a first signed word and a second animation corresponding with a second signed word,
    generating a transition animation to transition the character between the first animation and the second animation, wherein the character comprises a plurality of bones, each bone of the plurality of bones being connected to one or more joints and constrained to only rotate about the one or more joints associated with each bone, wherein the transition animation comprises a transition path for one or more bones of the plurality of bones of the character,
    generating the transition path for each bone of the one or more bones by:
        calculating kinematic boundary conditions for the transition path for the bone based on the first animation and the second animation, and
        calculating the transition path for the bone based on the kinematic boundary conditions, and wherein the kinematic boundary conditions for the transition path of each bone of the one or more bones comprise first animation kinematic boundary conditions associated with the first animation, and second animation kinematic boundary conditions associated with the second animation, and
    wherein the first animation kinematic boundary conditions comprise an orientation of each bone in the first animation, a velocity of each bone in the first animation, and an acceleration of each bone in the first animation, and
    wherein the second animation kinematic boundary conditions comprise an orientation of each bone in the second animation, a velocity of each bone in the second animation, and an acceleration of each bone in the second animation.

2. The method of claim 1, wherein the first animation kinematic boundary conditions are calculated at or near an end of the first animation.

3. The method of claim 1, wherein the second animation kinematic boundary conditions are calculated at or near a start of the second animation.

4. The method of claim 1, wherein the first animation kinematic boundary conditions are calculated at a time during the first animation and the second animation kinematic boundary conditions are calculated at a time during the second animation.

5. The method of claim 4, wherein the transition animation is generated from the time during the first animation and/or to the time during the second animation.

6. The method of claim 1, wherein the acceleration and the velocity of each bone is calculated by numerical differentiation of finite differences.

7. The method of claim 1, wherein the acceleration of each bone is based on a correction factor which is proportional to the velocity of each bone, and an axis component of the orientation.

8. The method of claim 1, wherein the kinematic boundary conditions are defined as quaternions.

9. The method of claim 1, wherein the transition path is shortest path between a or the orientation of the bone in the first animation, and a or the orientation of the bone in the second animation.

10. The method of claim 1, wherein a transition path time for each transition path is calculated.

11. The method of claim 10, wherein a transition time for the transition animation determined based on a longest transition path time of all transition paths.

12. The method of claim 10, wherein the transition path time for each transition path is calculated based on a distance travelled by the bone between the first animation and the second animation.

13. The method of claim 10, wherein the transition path time for each transition path is calculated based on a difference in a quaternion angle component of: an orientation of the first kinematic boundary conditions and an orientation of the second kinematic boundary conditions.

14. The method of claim 10, wherein the transition path time for each transition path is calculated based on a bone constant which is based on a bone type.

15. The method of claim 11, wherein the transition path for each bone of the one or more bones is calculated per time step.

16. The method of claim 15, wherein the time step is $$\frac{1}{\text{frame rate}}$$

of the transition animation.

17. The method of claim 1, wherein the transition paths are defined by an orientation of each bone at each time step.

18. The method of claim 1, wherein the transition paths are defined by rotation of each bone about a joint.

19. The method of claim 1, wherein a first animation time of the first animation, a second animation time of second animation and transition time for the transition animation are scaled based on a global time variable.

20. The method of claim 1, wherein a first animation time of the first animation is scaled based on a first animation time scaling variable.

21. The method of claim 1, wherein a second animation time of the second animation is scaled based on a second animation time scaling variable.

22. The method of claim 1, wherein a transition time of the transition animation is scaled based on a transition time animation scaling variable.

23. The method of claim 1, wherein a finger transition animation between the first animation and the second animation for fingers of at least one hand of the character is calculated based on an easing function.

24. The method of claim 23, wherein when a distance between a wrist of the at least one hand in the first animation and the wrist of at least one hand in the second animation is greater than a threshold distance, fingers of the hand are interpolated into a neutral hand pose during the hand transition animation.

25. The method of claim 1, wherein one or more post processing effects are overlaid onto the first animation, second animation and transition animation.

26. The method of claim 25, wherein the one or more post processing effects comprise a breathing animation.

27. The method of claim 26, wherein the breathing animation comprises a sinusoidal scaling function.

28. The method of claim 25, wherein the one or more post processing effects comprise Perlin noise.

29. The method of claim 28, wherein Perlin noise is generated based on a bone type of each bone.

30. The method of claim 1, wherein one or more facial animations of the first animation corresponds with the first signed word.

31. The method of claim 1, wherein one or more facial animations of the second animation corresponds with the second signed word.

32. The method of claim 1, wherein one or more transition facial animations is played during the transition animation.

33. The method of claim 32, wherein one or more transition facial animations is an interpolation between an end of one or more facial animations of the first animation and a start of the one or more facial animations of the second animation.

34. The method of claim 32, wherein the one or more transition facial animations are played on commencement of the transition animation, or independently to the transition animation.

35. The method of claim 30, wherein the one or more facial animations are played with the corresponding animation.

36. The method of claim 1, wherein a user interface is provided for a user to select at least the first signed word and the second signed word.

37. The method of claim 1, wherein the first animation and/or the second animation are selected from a database.

38. The method of claim 33, wherein adjacent animations are a first animation and a second animation, and the transition animation is generated.

39. A system comprising:
one or more processors; and
memory storing one or more programs,
wherein the one or more programs comprising instructions for undertaking the method as of claim 1.

40. The system of claim 39, wherein the system comprises a display in communication with the one or more processors configured to display the animations and the transition animations between adjacent animations.

41. The system of claim 39, wherein the system comprises one or more input devices configured to receive input as to the words to be animated.

42. A method of generating an animated sentence in sign language of a character comprising:
receiving an input of a sentence to be animated comprising a plurality of words,
selecting a plurality of animations of the character corresponding with each of the plurality of words of the sentence,
generating transition animations to transition the character between adjacent animations of the plurality of animations, the character comprising a plurality of bones, each bone of the plurality of bones being connected to one or more joints and constrained to only rotate about the one or more joints associated with each bone, and wherein each transition animation is generated based on at least the first animation kinematic boundary conditions associated with the first animation of adjacent animations, and second animation kinematic boundary conditions associated with the second animation of adjacent animations, and
wherein the first animation kinematic boundary conditions comprise an orientation of one or more bones of the plurality of bones in the first animation, a velocity of one or more bones of the plurality of bones in the first animation, and an acceleration of one or more bones of the plurality of bones in the first animation, and
wherein the second animation kinematic boundary conditions comprise an orientation of one or more bones of the plurality of bones in the second animation, a velocity of one or more bones of the plurality of bones in the second animation, and an acceleration of one or more bones of the plurality of bones in the second animation, and
generating the animated sentence by combining the plurality of animations and the transition animations.

43. The method of claim 42, wherein the animations are selected from a database.

* * * * *